US009286761B2

(12) United States Patent
Acres

(10) Patent No.: US 9,286,761 B2
(45) Date of Patent: Mar. 15, 2016

(54) SYSTEM FOR TRADE-IN BONUS

(75) Inventor: John F. Acres, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 1051 days.

(21) Appl. No.: 12/716,181

(22) Filed: Mar. 2, 2010

(65) Prior Publication Data

US 2011/0218030 A1 Sep. 8, 2011

(51) Int. Cl.

*G06F 17/00* (2006.01)
*G06F 19/00* (2011.01)
*G07F 17/32* (2006.01)
*G07F 17/34* (2006.01)
*A63F 9/24* (2006.01)

(52) U.S. Cl.

CPC .............. *G07F 17/3265* (2013.01); *A63F 9/24* (2013.01); *G07F 17/326* (2013.01); *G07F 17/3255* (2013.01); *G07F 17/3267* (2013.01); *G07F 17/34* (2013.01)

(58) Field of Classification Search

CPC ... G07F 17/32; G07F 17/326; G07F 17/3265; G07F 17/3267; G07F 17/3244; G07F 17/3255; G07F 17/3293; G07F 17/34

USPC ................. 463/13, 25, 16–20, 29–31, 40–43; 379/93.13; 273/138.2

See application file for complete search history.

(56) References Cited

U.S. PATENT DOCUMENTS 4,687,206 A 8/1987 Cordry et al.
5,231,568 A 7/1993 Cohen et al.
5,373,440 A 12/1994 Cohen et al.
5,511,781 A * 4/1996 Wood et al. ..................... 463/13
5,736,982 A 4/1998 Suzuki et al.
5,788,574 A 8/1998 Ornstein et al.
5,810,361 A 9/1998 Kadiic
5,882,258 A 3/1999 Kelly et al.
6,016,338 A * 1/2000 Bansal et al. .............. 379/93.13
6,135,884 A 10/2000 Hedrick et al.
6,176,781 B1 1/2001 Walker et al.
6,311,214 B1 10/2001 Rhoads
6,315,666 B1 11/2001 Mastera et al.
6,371,851 B1 4/2002 Singer et al.

(Continued)

FOREIGN PATENT DOCUMENTS

WO 02/33576 4/2002
WO 2007/067975 6/2007
WO 2009134257 11/2009

OTHER PUBLICATIONS

Avatar, Free Merriam-Webster Dictionary [Online] Retrieved Aug. 2, 2011. Retrieved from the internet: <http://www.merriam-webster.com/dictionary/avatar>.

(Continued)

*Primary Examiner* — Milap Shah

(74) *Attorney, Agent, or Firm* — Marger Johnson

(57) ABSTRACT

Embodiments of the present invention are directed to gaming systems that allow customers to wager, or "trade-in" an object of value or winning situation for a chance to win an even more valuable award. The chance for valuable award may be a bonus game or chance to win a bonus game. Bonus awards are "funded" by the savings achieved from the players trading in their wins in the base game, which would otherwise be paid. Players who do not trade-in see no changes from the base game paytable, while those players who participate in the trade-in bonus have a different gaming experience.

24 Claims, 12 Drawing Sheets

(56) References Cited

U.S. PATENT DOCUMENTS

| | | | | |
|---|---|---|---|---|
| 6,379,245 | B2 * | 4/2002 | De Keller | 463/13 |
| 6,651,984 | B1 | 11/2003 | Luken | |
| 6,726,563 | B1 * | 4/2004 | Baerlocher et al. | 463/25 |
| 6,942,565 | B2 | 9/2005 | Karn et al. | |
| 7,090,576 | B2 | 8/2006 | Herbrich et al. | |
| 7,169,052 | B2 | 1/2007 | Beaulieu et al. | |
| 7,275,990 | B2 | 10/2007 | Walker et al. | |
| 7,335,106 | B2 | 2/2008 | Johnson | |
| 7,384,338 | B2 | 6/2008 | Rothschild et al. | |
| 7,785,183 | B1 * | 8/2010 | Stockham et al. | 463/13 |
| 2002/0082065 | A1 | 6/2002 | Fogel et al. | |
| 2002/0082077 | A1 | 6/2002 | Johnson et al. | |
| 2002/0155873 | A1 * | 10/2002 | Berman et al. | 463/16 |
| 2003/0069063 | A1 | 4/2003 | Bilyeu et al. | |
| 2003/0073496 | A1 | 4/2003 | D'Amico et al. | |
| 2003/0104854 | A1 * | 6/2003 | Cannon | 463/16 |
| 2003/0114219 | A1 * | 6/2003 | McClintic | 463/25 |
| 2003/0119579 | A1 | 6/2003 | Walker et al. | |
| 2003/0190943 | A1 * | 10/2003 | Walker et al. | 463/17 |
| 2003/0230848 | A1 | 12/2003 | Mellerowicz | |
| 2004/0005919 | A1 | 1/2004 | Walker et al. | |
| 2004/0023709 | A1 | 2/2004 | Beaulieu et al. | |
| 2004/0033826 | A1 * | 2/2004 | Berman | 463/16 |
| 2004/0064504 | A1 | 4/2004 | Domschitz | |
| 2004/0162134 | A1 | 8/2004 | Walker et al. | |
| 2004/0204246 | A1 | 10/2004 | Halliburton et al. | |
| 2004/0229700 | A1 | 11/2004 | Cannon et al. | |
| 2005/0003890 | A1 | 1/2005 | Hedrick et al. | |
| 2005/0009608 | A1 | 1/2005 | Robarts et al. | |
| 2005/0035551 | A1 | 2/2005 | Weigl et al. | |
| 2005/0079908 | A1 * | 4/2005 | Pacey | 463/20 |
| 2005/0137015 | A1 | 6/2005 | Rogers et al. | |
| 2005/0143174 | A1 | 6/2005 | Goldman et al. | |
| 2005/0216529 | A1 | 9/2005 | Ashtekar et al. | |
| 2005/0223328 | A1 | 10/2005 | Ashtekar et al. | |
| 2005/0248574 | A1 | 11/2005 | Ashtekar et al. | |
| 2005/0261058 | A1 | 11/2005 | Nguyen et al. | |
| 2006/0030397 | A1 | 2/2006 | Chan | |
| 2006/0033275 | A1 | 2/2006 | Trass et al. | |
| 2006/0063587 | A1 | 3/2006 | Manzo | |
| 2006/0073879 | A1 | 4/2006 | Baerlocher | |
| 2006/0079309 | A1 * | 4/2006 | Walker et al. | 463/13 |
| 2006/0089191 | A1 | 4/2006 | Singer et al. | |
| 2006/0128460 | A1 | 6/2006 | Muir et al. | |
| 2006/0148549 | A1 | 7/2006 | Walker et al. | |
| 2006/0189382 | A1 | 8/2006 | Muir et al. | |
| 2006/0211489 | A1 | 9/2006 | Walker et al. | |
| 2006/0211493 | A1 | 9/2006 | Walker et al. | |
| 2006/0211496 | A1 | 9/2006 | Manz | |
| 2006/0211497 | A1 | 9/2006 | Manz | |
| 2006/0217187 | A1 | 9/2006 | Walker et al. | |
| 2006/0217188 | A1 | 9/2006 | Walker et al. | |
| 2006/0217194 | A1 | 9/2006 | Walker et al. | |
| 2006/0226598 | A1 | 10/2006 | Walker et al. | |
| 2006/0226599 | A1 | 10/2006 | Walker et al. | |
| 2006/0229124 | A1 | 10/2006 | Walker et al. | |
| 2006/0248025 | A1 | 11/2006 | Walker et al. | |
| 2006/0252512 | A1 | 11/2006 | Walker et al. | |
| 2006/0258434 | A1 | 11/2006 | Jaffe et al. | |
| 2006/0264254 | A1 | 11/2006 | Aoki | |
| 2006/0287040 | A1 | 12/2006 | Walker et al. | |
| 2007/0015564 | A1 | 1/2007 | Walker et al. | |
| 2007/0032287 | A1 * | 2/2007 | Osawa | 463/16 |
| 2007/0057468 | A1 | 3/2007 | Bruner, Jr. | |
| 2007/0135214 | A1 | 6/2007 | Walker et al. | |
| 2007/0135215 | A1 | 6/2007 | Walker et al. | |
| 2007/0142107 | A1 | 6/2007 | Kuhn et al. | |
| 2007/0167235 | A1 | 7/2007 | Naicker | |
| 2007/0203971 | A1 | 8/2007 | Walker et al. | |
| 2007/0207846 | A1 | 9/2007 | Burak et al. | |
| 2007/0287523 | A1 | 12/2007 | Esses et al. | |
| 2007/0293315 | A1 | 12/2007 | Mizuta | |
| 2008/0026816 | A1 | 1/2008 | Sammon et al. | |
| 2008/0039174 | A1 | 2/2008 | Litman | |
| 2008/0054560 | A1 * | 3/2008 | Presley et al. | 273/138.2 |
| 2008/0064491 | A1 | 3/2008 | Taylor | |
| 2008/0125212 | A1 | 5/2008 | Schofield | |
| 2008/0171585 | A1 * | 7/2008 | Jackson | 463/16 |
| 2008/0200245 | A1 | 8/2008 | Trobia | |
| 2008/0248870 | A1 | 10/2008 | Kato et al. | |
| 2009/0054134 | A1 * | 2/2009 | Jackson | 463/25 |
| 2009/0075722 | A1 * | 3/2009 | Louie et al. | 463/20 |
| 2009/0082101 | A1 | 3/2009 | Ostergren et al. | |
| 2009/0093290 | A1 | 4/2009 | Lutnick et al. | |
| 2009/0117989 | A1 | 5/2009 | Arezina et al. | |
| 2009/0170593 | A1 | 7/2009 | Pacey | |
| 2009/0191962 | A1 | 7/2009 | Hardy et al. | |
| 2009/0197684 | A1 | 8/2009 | Arezina et al. | |
| 2009/0275375 | A1 | 11/2009 | Acres | |
| 2010/0035678 | A1 | 2/2010 | Antonides | |
| 2010/0248806 | A1 | 9/2010 | Engleman et al. | |
| 2011/0014975 | A1 | 1/2011 | Grabiec et al. | |

OTHER PUBLICATIONS

Game Makers Unveil Groundbreaking New Games and Systems, G2E Convention Coverage, Dec. 2007, pp. 42-47, Indian Gaming.

* cited by examiner

500

Pay Table for 5-Card Draw Poker

| | Pay | Probability | Contribution |
|---|---|---|---|
| Royal Flush | 800 | 0.0025% | 1.99% |
| Straight Flush | 50 | 0.0108% | 0.54% |
| Four Aces | 80 | 0.0201% | 1.60% |
| Four 2, 3, 4 | 40 | 0.0527% | 2.11% |
| Four 5 through King | 25 | 0.1639% | 4.10% |
| Full House | 6 | 1.1407% | 6.84% |
| Flush | 5 | 1.0900% | 5.45% |
| Straight Flush | 4 | 1.1275% | 4.51% |
| Three of a Kind | 3 | 7.4531% | 22.36% |
| Two Pair | 2 | 12.9254% | 25.85% |
| Jacks or Better | 1 | 21.5176% | 21.52% |
| Optimal Payback | | 98.872% | |
| Hit Frequency | | 45.500% | |

FIG. 5
(Conventional)

SYSTEM FOR TRADE-IN BONUS

FIELD OF THE INVENTION

This disclosure relates generally to gaming systems, and more particularly to bonuses for gaming systems.

BACKGROUND

Gaming systems are designed around the thrill of winning. Gamblers wager something of value, i.e. money or credits, for the chance to win even more. Personal preferences abound regarding styles of gaming, however. Some prefer to play for a relatively long time without much change in their holdings. For example, some players prefer to start with a certain size "bank" of credits, and enjoy winning and losing relatively small amounts compared to their bank, or their individual game wagers, over time. These players may wager only a few credits, repeatedly, and prefer such low-volatility games that do not typically award extremely high wins, but award them relatively frequently.

Other players find more thrill with volatile style of play. Such players will often bet the "max" bet and will sustain losses for a relatively long time, or in a relatively large amount in comparison to their wagers or credit bank, in search of the big payoff.

This chance of loss is important for both entertainment reasons and to allow the game operator to profit. By providing wins and losses of varying amounts, depending on game outcome but according to a known paytable, an advantage to the game operator can be ensured over a statistically significant large number of games. Individual players may win or lose any particular game, or gaming session, but, over a long period of time, the odds statistically favor the house. This "house advantage" is important because it allows the game operator to operate a business that offers the games for the enjoyment of the customers.

Gaming paytables are set by controlling authorities, and are not easily changeable. Because not all paytables provide a good match for the style of play of every player, there exists an enjoyment chasm where a player may enjoy a game more were there more or different paytable options available.

Embodiments of the invention address these and other limitations of the prior art.

BRIEF DESCRIPTION OF THE DRAWINGS

FIG. 5 is a table showing a conventional paytable for a poker game.

DETAILED DESCRIPTION

Figure 1:
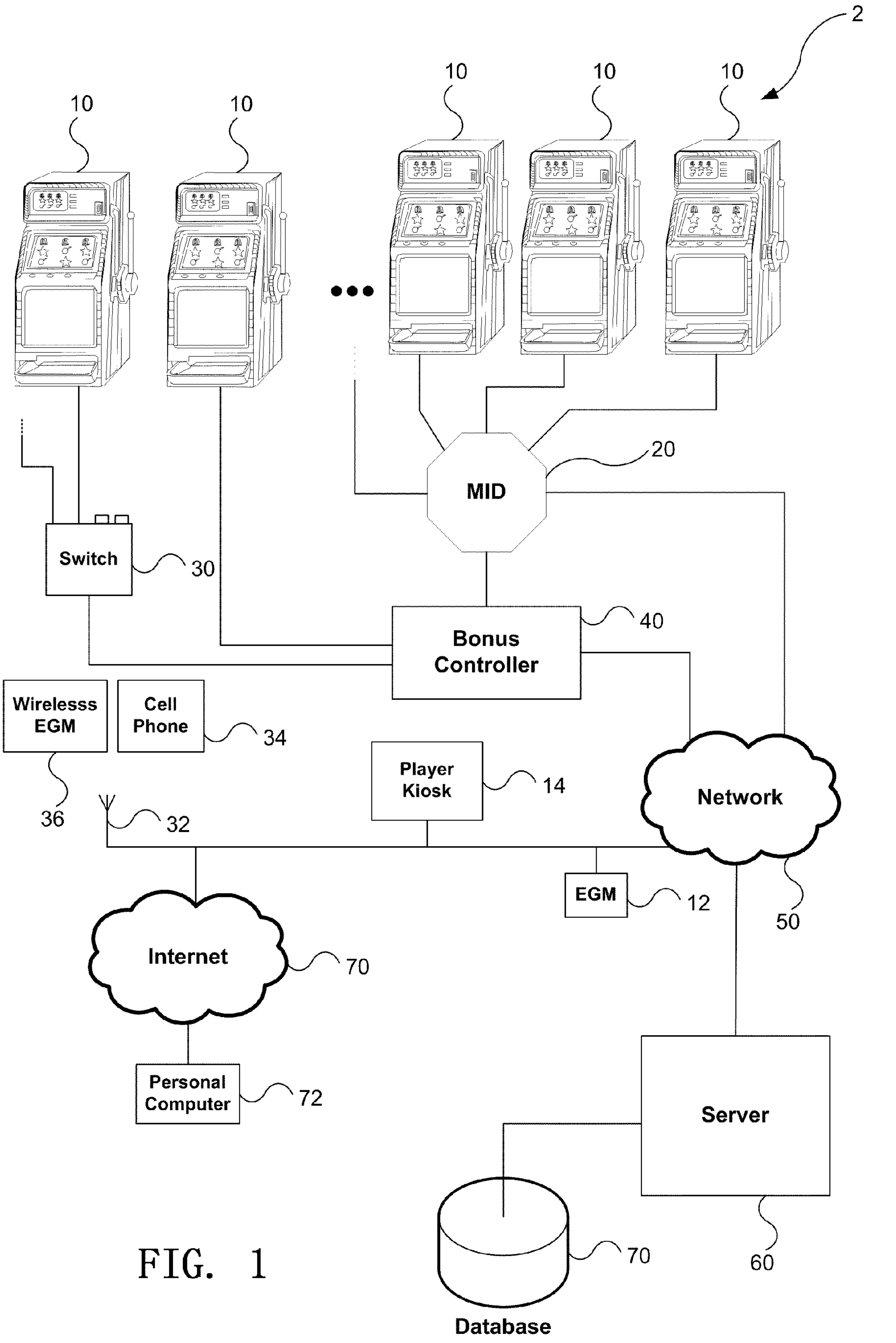
FIG. 1 is a system diagram illustrating various components of a gaming system according to embodiments of the invention.

FIG. 1 is a system diagram illustrating various components of a gaming system according to embodiments of the invention. Referring to FIG. 1, the gaming system 2 includes several gaming devices, also referred to as Electronic Gaming Machines (EGMs) 10 that are connected to a gaming network 50 through various communication mechanisms.

In general, a gaming network 50 connects any of a number of EGMs 10, or other gaming devices, such as those described below, for central management. Accounting and other functions may be served by a connected server 60 and database 70. For example many player tracking functions, bonusing systems, and promotional systems may be centrally administrated from the server 60 and database 70. In some embodiments there may be multiple servers 60 and databases 70, each performing different functions. In other embodiments functions may be combined and operate on a single or small group of servers 60, each with their own database 70 or combined databases.

Many of the EGMs 10 of FIG. 1 connect to the gaming network 50 through a Machine Interface Device, MID 20. In general, the MID 20 is a multi-protocol interface that monitors communication between the gaming network 50 and the EGM 10. In a common embodiment, the MID 20 communicates to the EGM 10 through a standard gaming network port, using a standard gaming network protocol, SAS, which is well known in the gaming industry. Most modern games include at least one communication port, which is commonly a SAS port or a port for another communication protocol. The MID 20, along with its various functions and communication methods is described in detail with reference to FIGS. 3A and 3B below.

Other EGMs 10 in FIG. 1 connect to the gaming network 50 through a bonus controller 40, which may be coupled between the gaming network 50 and gaming device 10. The bonus controller 40 generally communicates through a non-SAS protocol, such as another well-known communication protocol known as GSA. GSA is typically carried over an Ethernet network, and thus the bonus controller 40 includes an Ethernet transceiver, which is described with reference to FIG. 4 below. Because the bonus controller 40 communication may be Ethernet based, a switch 30 may be used to extend the number of devices that may be coupled to the bonus controller 40. The bonus controller 40 and/or the MID 20 may create or convert data or information received according to a particular protocol, such as SAS, into data or information according to another protocol, such as GSA. In this way the MID 20 and bonus controller 40 are equipped to communicate, seamlessly, between any EGM 10 and gaming network 50 no matter which communication protocols are in use. Further, because the MID 20 and bonus controller 40 are programmable, and include multiple extensible communication methods, as described below, they are capable of communicating with EGMs 10 that will communicate using protocols and communication methods developed in the future.

Other games or devices on which games may be played are connected to the gaming network using other connection and/or communication methods. For instance, an EGM 12 may couple directly to the network 50 without any intervening hardware, other than hardware that is built into the EGM 12 to connect it to the network 50. Likewise, a player kiosk 14 may be directly coupled to the gaming network. The player kiosk 14 allows players, managers, or other personnel to access data on the gaming network 50, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 32 couples the gaming network 50 to a wireless EGM 36, such as a handheld device, or, through a cell phone or other compatible data network, the transceiver 32 connects to a cellular phone 34. The cellular phone 34 may be a "smart phone," which in essence is a handheld computer capable of playing games or performing other functions on the gaming network 50, as described in some embodiments of the invention.

The gaming network 50 also couples to the internet 70, which in turn is coupled to a number of computers, such as the personal computer 72 illustrated in FIG. 1. The personal computer 72 may be used much like the kiosk 14, described above, to manage player tracking or other data kept on the gaming network 50. More likely, though, is that the personal computer 72 is used to play actual games in communication with the gaming network 50. Player data related to games and other functions performed on the personal computer 72 may be tracked as if the player were playing on an EGM 10.

In general, in operation, a player inserts a starting credit into one of the games, such as an EGM 10. The EGM 10 sends data through its SAS or other data communication port through the MID 20 and/or bonus controller 50 to the gaming network 50. Various servers 60 and databases 70 collect information about the gameplay on the EGM 10, such as wagers made, results, various pressing of the buttons on the EGM 10, for example. In addition, the SAS port on the EGM 10 may also be coupled, through the MID 20 as described below, to other systems, such as player tracking systems, accounting, and ticketing systems, such as Ticket-In-Ticket-Out (TITO) systems.

In addition, the EGM 10 accepts information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 40 is structured to perform some of the above-described functions as well. For example, in addition to standard games on the EGM 10, the bonus controller 40 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 40 and MID 20 are a sub-system capable of interfacing with each of the EGMs on a gaming network 50. Through this interface, the MID 20 may gather data about the game, gameplay, or player, or other data on the EGM 10, and forward it to the bonus controller 40. The bonus controller 40 then uses such collected data as input and, when certain conditions are met, sends information and/or data to the EGM 10 to cause it to perform certain functions.

In a more detailed example, suppose a player is playing an EGM 10 coupled to the MID 20 and the bonus controller 40 described above. The player inserts a player tracking card so the gaming network 50 knows the player identity. The MID 20 also stores such identifying information, or perhaps stores only information that the player is a level-2 identified player, for instance. The MID 20 passes such information to the bonus controller 40, which has been programmed to provide a welcome-back bonus to any level-2 player after he or she has played two games. Gameplay on the EGM 10 continues and, after the player plays two games, the bonus controller 40 instructs the EGM 10 to add an additional 40 credits to the EGM 10 as the welcome-back bonus. Such monitoring and control of the EGM 10 can occur in conjunction with, but completely separate from any player tracking or bonusing function that is already present on the gaming network 50. In other words, the server 60, when structured at least in part as a bonusing server, may be set to provide a time-based bonus of 10 credits for every hour played by the player of the EGM 10. The above-described welcome-back bonus may be managed completely separately through the bonus controller 40 and MID 20. Further, all of the actions on the EGM 10 caused by the bonus controller 40 are also communicated to the standard accounting, tracking, and other systems already present on the gaming network 50.

Figure 2:
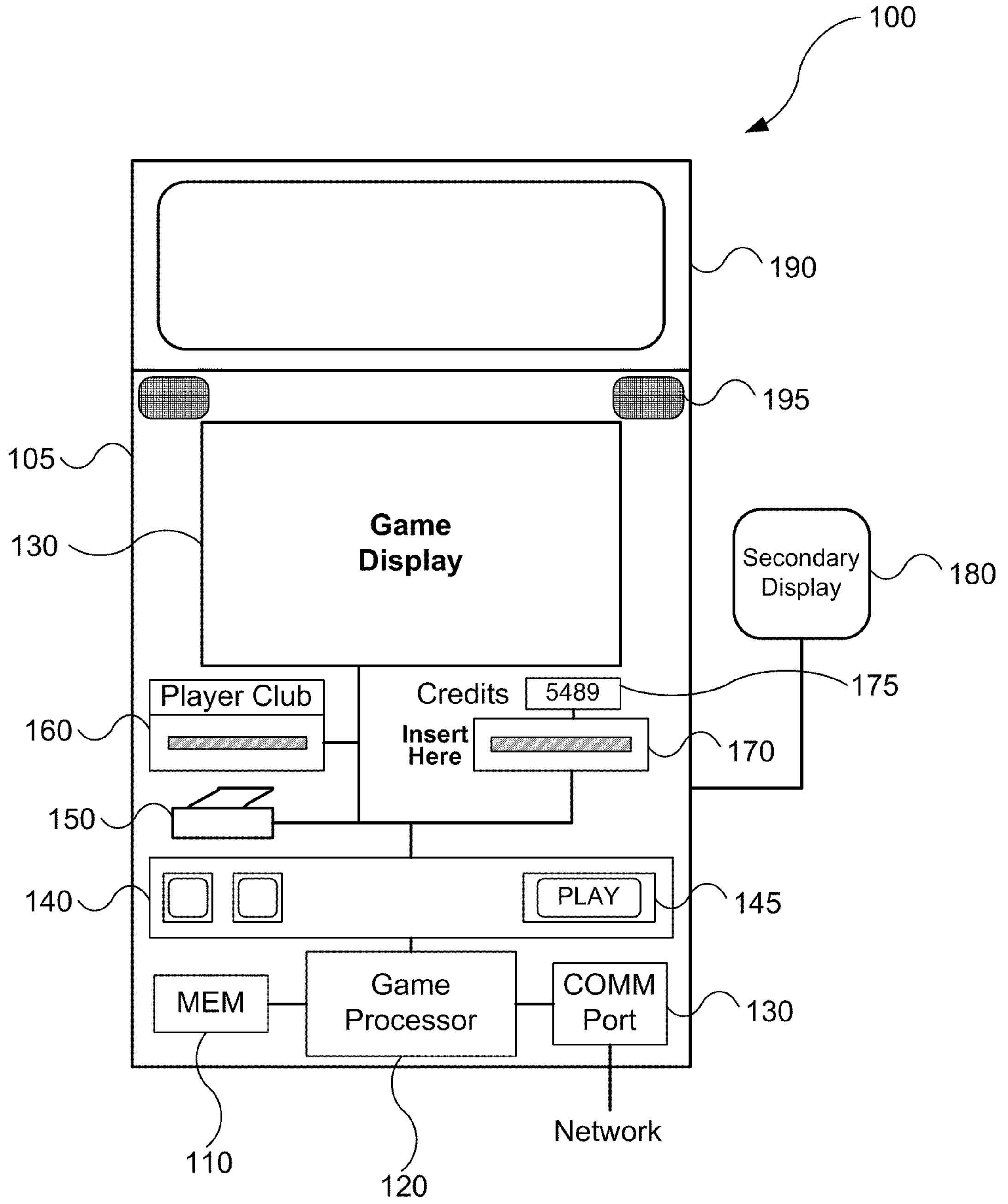
FIG. 2 is a functional block diagram that illustrates an example gaming device that can be a part of the gaming system shown in FIG. 1.

FIG. 2 is a functional block diagram that illustrates an example gaming device that can be a part of the gaming system shown in FIG. 1. Referring to FIG. 2, the illustrated gaming device 100 is an example of the EGMs 10, 12 that are shown in FIG. 1. These EGMs 10, 12 may include all types of electronic gaming machines, such as physical reel slot machines, video slot machines, video poker gaming devices, video blackjack machines, keno games, and any other type of devices may be used to wager monetary-based credits on a game of chance. As mentioned above, various other types of gaming devices may be connected to the network 50 (FIG. 1) such as wireless gaming devices 36, computers used for gaming purposes 72, cellular phones 34, multi-player gaming stations, server-based gaming terminals, etc.

Returning to FIG. 2, the illustrated gaming device 100 includes a cabinet 105 to house various parts of the gaming device 100, thereby allowing certain components to remain securely isolated from player interference, while providing access to player input/output devices so that the player may interact with the gaming device. The securely housed components include the game processor 120, memory 110, and connection port 130. The game processor 120, depending on the type of gaming device 100, may completely or partially control the operation of the gaming device. For example, if the gaming device 100 is a standalone gaming device, game processor 120 may control virtually all of the operations of the gaming device and attached equipment. In other configurations, the game processor 120 may implement instructions generated by or communicated from a remote server (e.g., server 60 shown in FIG. 1) or other controller. For example, the game processor 120 may be responsible for running a base game of the gaming device 100 and executing instructions received over the network 50 from a bonus server or player tracking server. In a server-based gaming environment, the game processor 120 may simply act as a terminal to perform instructions from a remote server that is running game play on the gaming device 100.

The memory 110 is connected to the game processor 120 and may be configured to store various game information about gameplay or player interactions with the gaming device 100. This memory may be volatile (e.g., RAM), non-volatile (e.g., flash memory), or include both types of memory. The connection port 130 is also connected to the game processor 120. This connection port 130 typically connects the gaming device 100 to a gaming network, such as the gaming network 50 described above. The connection port 130 may be structured as a serial port, parallel port, Ethernet port, optical connection, wireless antenna, or any other type of communication port used to transmit and receive data. Although only one connection port 130 is shown in FIG. 1, the gaming device 100 may include multiple connection ports. As described above, in many existing gaming devices, this connection port 130 is a serial connection port utilizing a SAS protocol to communicate to one or more remote game servers, such as player tracking servers, bonus servers, accounting servers, etc.

The player input/output devices housed by the gaming cabinet 105 include a game display 130, a button panel 140 having one or more buttons 145, a ticket printer 150, a bill/ticket reader 170, a credit meter 175, a player club interface device 160, and one or more game speakers 195. Various gaming devices may include fewer or more input/output devices (e.g., a game handle, a coin acceptor, a coin hopper, etc.) depending upon the configuration of the gaming device.

The gaming display 130 may have mechanical spinning reels, a video display, or include a combination of both spinning reels and a video display, or use other methods to display aspects of the gameplay to the player. If the gaming display 130 is a video display, the gaming display may include a touch screen to further allow the player to interact with game indicia, soft buttons, or other displayed objects. The button panel 140 allows the player to select and place wagers on the game of chance, as well as allowing the player to control other aspects of gaming. For example, some gaming devices allow the player to press a button 145 to signal that he or she requires player assistance. Other buttons may bring up a help menu and/or game information. The buttons 145 may also be used to play bonuses or make selections during bonus rounds.

Ticket printers 150 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 130.

Another peripheral device that often requires communication with a remote server is the player club interface device 160. The player club interface device 160 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 160 communicates with a remote player server through the connection port 130 to associate a player account with the gaming device 100. This allows various information regarding the player to be communicated between the gaming device 100 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player so as to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 100 include a credit meter 175, a bill/ticket acceptor 170, and speakers 195. The credit meter 175 generally indicates the total number of credits remaining on the gaming device 100 that are eligible to be wagered. The credit meter 175 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 170 typically recognizes and validates paper bills and/or printed tickets and causes the game processor 120 to display a corresponding amount on the credit meter 175. The speakers 195 play auditory signals in response to game play or may play enticing sounds while in an "attract-mode," when a player is not at the gaming device. The auditory signals may also convey information about the game, such as by playing a particularly festive sound when a large award is won.

The gaming device 100 may include various other devices to interact with players, such as light configurations, top box displays 190, and secondary displays 180. The top box display 190 may include illuminated artwork to announce a game style, a video display (such as an LCD), a mechanical and/or electrical bonus display (such as a wheel), or other known top box devices. The secondary display 180 may be a vacuum fluorescent display (VFD), a liquid crystal display (LCD), a cathode ray tube (CRT), a plasma screen, or the like. The secondary display 180 may show any combination of primary game information and ancillary information to the player. For example, the secondary display 180 may show player tracking information, secondary bonus information, advertisements, or player selectable game options. The secondary display may be attached to the game cabinet 105 or may be located near the gaming device 100. The secondary display 180 may also be a display that is associated with multiple gaming devices 100, such as a bank-wide bonus meter, or a common display for linked gaming devices.

In operation, typical play on a gaming device 100 commences with a player placing a wager on a game to generate a game outcome. In some games, a player need not interact with the game after placing the wager and initiating the game, while in other games, the player may be prompted to interact with the gaming device 100 during game play. Interaction between the player and the gaming device 100 is more common during bonuses, but may occur as part of the game, such as with video poker. Play may continue on the gaming device 100 until a player decides to cash out or until insufficient credits remain on the credit meter 175 to place a minimum wager for the gaming device.

Communication between gaming devices, such as those described above, and other devices on gaming systems 2 (FIG. 1) is becoming increasingly more complex. The below-described system illustrates a system and method of communication on modern and future gaming systems.

Figure 3A:
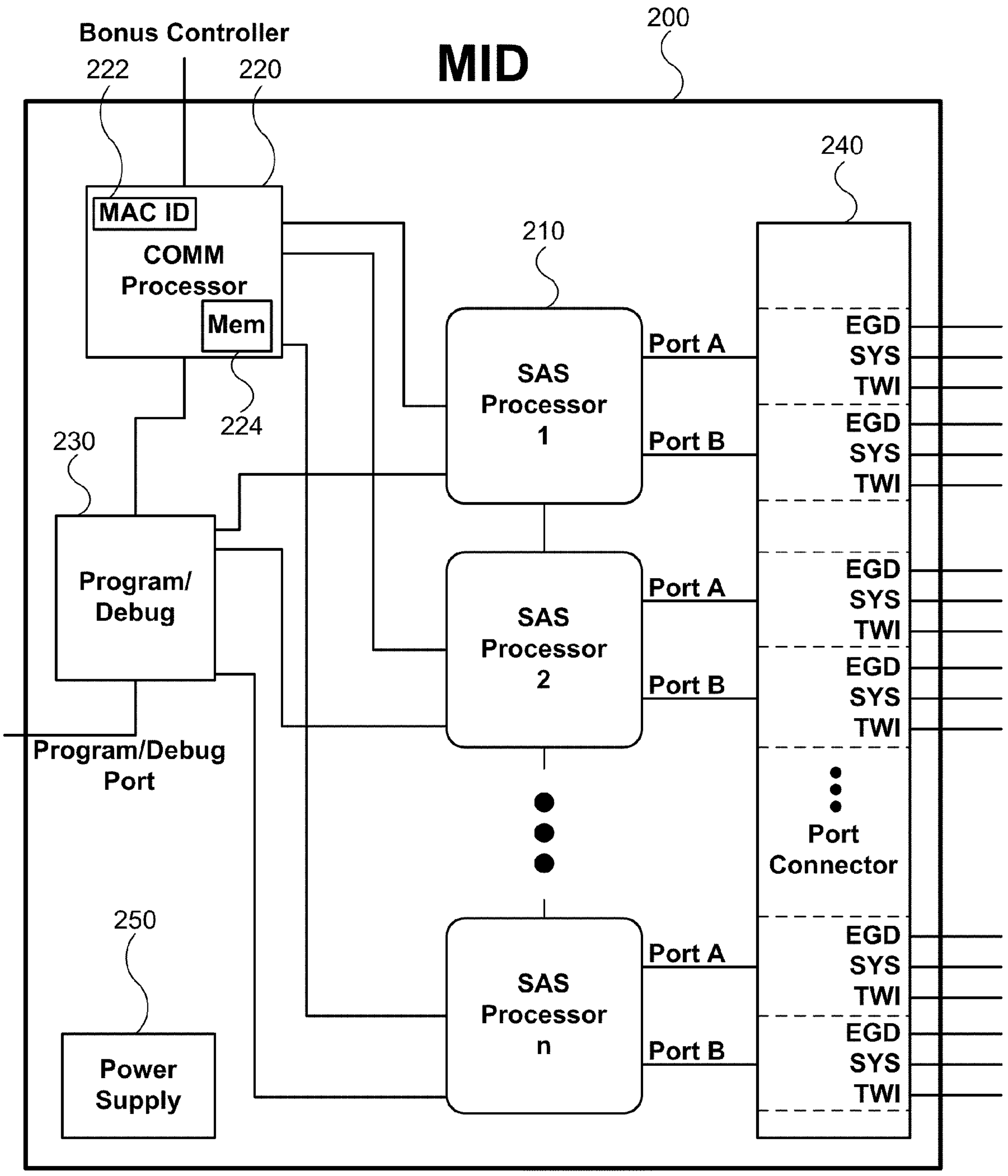
FIG. 3A is a block diagram of an example machine interface device shown in FIG. 1 according to embodiments of the invention.

FIG. 3A is a block diagram of a MID 200, which may be an example of the MID 20 described with reference to FIG. 1 above. The MID 200 includes a set of processors 210, which in this example are termed SAS processors. These SAS processors are capable of accepting, manipulating, and outputting data on a SAS protocol network.

The MID 200 is capable of communicating using other communication protocols as well, as described below. Each processor 210 is structured to couple to two Electronic Gaming Devices (EGDs). EGDs may include, for example, gaming devices such as EGM 10 of FIG. 1, or other electronic gaming devices. In the illustrated embodiment, each SAS processor 210 includes two ports, A and B, each of which may be coupled to an EGD. In turn, the two ports A and B are attached to a set of physical connectors, illustrated here as a single connector 240 for convenience of explanation. Each section of the physical connector 240, delineated by dotted lines, includes three separate pairs of communication lines. Each pair of communication lines is illustrated as a single line—a first serial pair labeled EGD, a second serial pair labeled SYS, and a third communication pair that uses two-wire communication, labeled TWI. Note that each of the ports A and B of the SAS processor 210 includes all three communication pairs. Additionally each of the sections of the physical connector 240 includes wires for a voltage and ground reference, though not depicted in FIG. 3A. In an embodiment of the MID 200 with four SAS processors 210, the physical connector 240 includes up to eight sections, each of which may be embodied by a separate, standard, RJ-45 connector to couple to a matching RJ-45 port in the connected EGM 10, or EGD, as determined by the specific implementation.

As illustrated in FIG. 3A, the first serial pair of Port A couples to EGD. The second serial pair may be coupled to external devices connected to the EGD, as needed. Specifically, some serial data protocols, such as SAS, do not allow EGMs 10 to interface with multiple external devices over a single serial communication path. Such external devices may include, for example, player tracking systems and accounting systems. If a particular EGM 10 is already connected to such a system, and thus its SAS port is "full," the MID 200, and in particular a SAS processor 210, may insert itself "between" the connected system and the EGM 10 by using both of the serial pairs in a particular port of the SAS processor 210 to couple to the EGM 10 and the other connected system, respectively. In operation, the MID 200, through the respective SAS processor 210, passes any information directed from the external device coupled to the SYS communication lines in a particular port to the EGD of the same port, or vice-versa, in real time and without interruption. For example, polls, requests for information, and transmission of information are passed from a connected player tracking system, through the SYS lines of Port A to the serial line EGD of Port A. Only a small communication delay is added using such a communication system, which is well within the tolerance limits of SAS protocol. As a result, both the EGM 10 and external system behave as if the MID 200 were not present.

Further, the third communication pair, a two-wire interface labeled TWI, presents opportunity for expansion to future systems installed on the EGM 10, or a new EGM, so that any data may be communicated between the EGM 10 and the MID 200. The TWI may be connected to card readers, top boxes, ticket dispensers, lighting panels, etc. that are coupled to or work in conjunction with an EGM 10.

Besides simply passing information between communication interfaces, the MID 200 also generates information directly for connected EGDs, which may originate from the MID 200 or from another device as described below. In such a case the SAS processor 210 sends the appropriate data through its appropriate serial line or two-wire interface directly to the desired EGD. Then the EGD may send its own data to its connected peripheral.

Referring back to FIG. 3A, the MID 200 additionally includes a communication processor 220, labeled as COMM processor. The communication processor 220 is coupled to each of the SAS processors 210, a program/debug circuit 230, and to a bonus controller 40 (FIG. 1). In practice, the communication processor 220 may be embodied by a small microprocessor, such as the Atmel ATXMEGA256A3, which is readily available to developers, or any other processor or system capable of performing the desired communication functions.

The communication processor 220 collects and aggregates information from the EGDs that are coupled to each of the SAS processors 210 and sends the aggregated information to the bonus controller 40 of FIG. 1. In some embodiments the communication processor 220 is coupled to the bonus controller 40 through an Ethernet interface. The communication processor is structured to parse information from Ethernet data packets and collect it for use by other systems within the MID 200. Because Ethernet is an addressed protocol, by which messages may be sent to a particular Ethernet address, the communication processor 220 also includes an address of the Ethernet device in a MAC ID 222.

The communication processor 220 may also accept information from the bonus controller 40, or other connected devices, and pass such information to the EGDs coupled to the SAS processors 210. The information may include data, instructions, or commands, for instance.

A memory 224, which may be, for instance Ferroelectric Random Access Memory (FRAM) capable of retaining stored contents for over 10 years may be used by the communication processor for both program and data storage. Of course, other memory technologies may be used instead of or in addition to FRAM.

A program/debug circuit 230 in the MID 200 connects to the communication processor 220 as well as to each of the SAS processors 210. During manufacture of the MID 200, the programming functions of the program/debug circuit 230 load program code to each of the SAS processors 210 as well as the communication processor 220. This initial loading may take place through a program/debug communication port. Further, the program codes stored in each of the SAS processors 210 and the communication processor 230 may be updated through commands and data sent from an external device, such as the bonus controller 40, through the communication processor 220 to the program/debug circuit 230. The program/debug circuit 230 then formats the updated program data for each of the connected SAS processors 210 and communication processor 220, and sends a command to each of the processors to be updated to load the new program code.

Figure 3B:
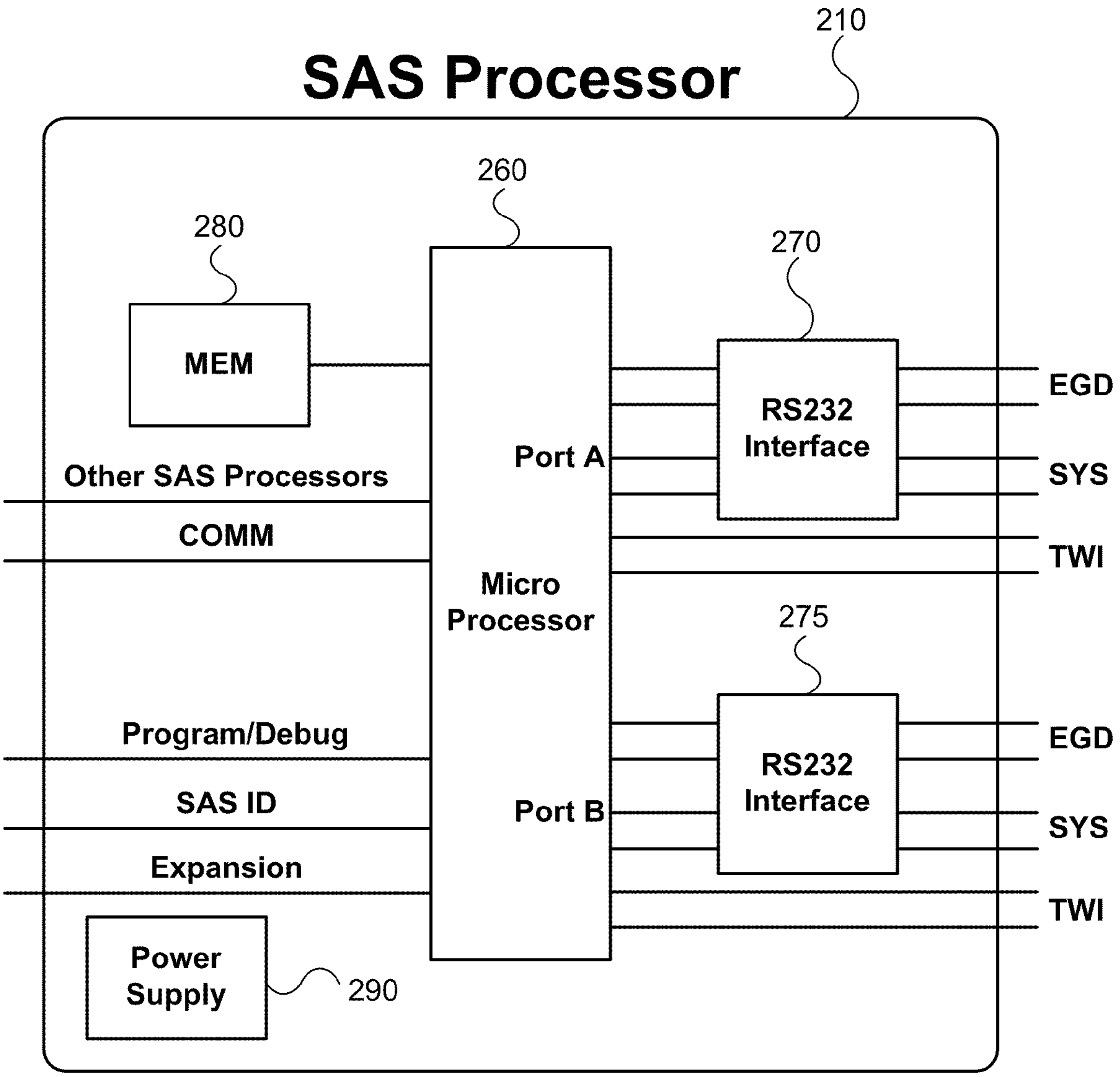
FIG. 3B is a block diagram of an example processor in the machine interface device illustrated in FIG. 3A according to embodiments of the invention.

FIG. 3B is a block diagram of one of the SAS processors 210 of FIG. 3A, which shows additional detail of the SAS processor.

As described above, each of the SAS processors 210 include two separate ports, Port A and Port B, illustrated here as separate ports of a microprocessor 260. The microprocessor 260 in the SAS processor 210 may be embodied by an Atmel ATXMEGA256A3, as described above.

Each of the ports of the microprocessor 260 is structured to couple to an EGD, which may be an EGM 10 of FIG. 1. Each port of the microprocessor 260 includes two serial connections, which in the example embodiment illustrated in FIG. 3B, are RS-232 ports common in the computing industry. The RS-232 ports are contained in an RS-232 interface 270, 275, one for each port of the microprocessor 260. Each of the interfaces 270, 275 includes two separate RS-232 ports, each of which uses a separate transmit and receive wire. Thus, each interface 270, 275 includes a total of four wires. It is convenient to include RS-232 ports as the preferred mode of communication because it is the standard interface for SAS ports of the EGMs 10. In non-standard EGMs 10, such as very old or future devices that may not include SAS ports, communication ports other than RS-232 may be used simply by exchanging or updating the RS-232 interfaces 270, 275. Another possibility is to include an RS-232 translator in any EGM 10 that does not include its own RS-232 interface. As illustrated in FIG. 3B, and as described above, the first of the serial connections, labeled EGD, is connected to an EGD for the particular port of the microprocessor 260, while the second serial connection, labeled SYS is connected to external devices that may be coupled to the particular EGD.

Additionally, and as described above, each SAS processor 210 includes two, two-wire interfaces, illustrated as a separate interface pair and labeled as TWI. In this embodiment, there is one pair for each port of the microprocessor 260. Each two-wire interface creates a bi-directional serial port that may be used for communicating with peripheral or expansion devices associated with the EGD of the particular microprocessor 260, or with other devices on the gaming system 2 of FIG. 1.

The SAS processor 210 includes a memory 280 for storing instruction data of the microprocessor 260 as well as providing data storage used by the SAS processor. The memory 280 is preferably non-volatile memory, such as FRAM that is connected to the microprocessor 260 through a serial interface.

As described above, the SAS processor 210 of the MIB 200 (FIG. 3A) includes multiple connections to other components in the MIB 200, which are illustrated in detail in FIG. 3B. Initially, each SAS processor 210 is coupled to each of the other SAS processors 210 in the MIB 200. In practice, this may accomplished by a direct connection, in which each microprocessor 260 is directly coupled to one another, or such connection may be an indirect connection. In an indirect connection, the microprocessors 260 of each SAS processor 210 is coupled to the communication processor 220 (FIG. 3A). Any data or information to be shared between SAS processors 210 is then originated by or passed through the communication processor 220 to the other SAS processors.

Similarly, as described above, the microprocessor 260 of each SAS processor 210 is coupled to a program/debug circuit 230 for initial or later programming. To communicate with each SAS processor 210 individually, each SAS processor is given an individual identification number, which may be set for the microprocessor 260 by tying particular data pins of the microprocessor to permanent low or high signals. Using binary encoding, n individual lines are used to identify 2n separate processors. A set of expansion pins couples to the microprocessor 260 of each SAS processor 210 so that each processor may determine system identification and revisions of the MIB 200 and the connected bonus controller 40.

Figure 4:
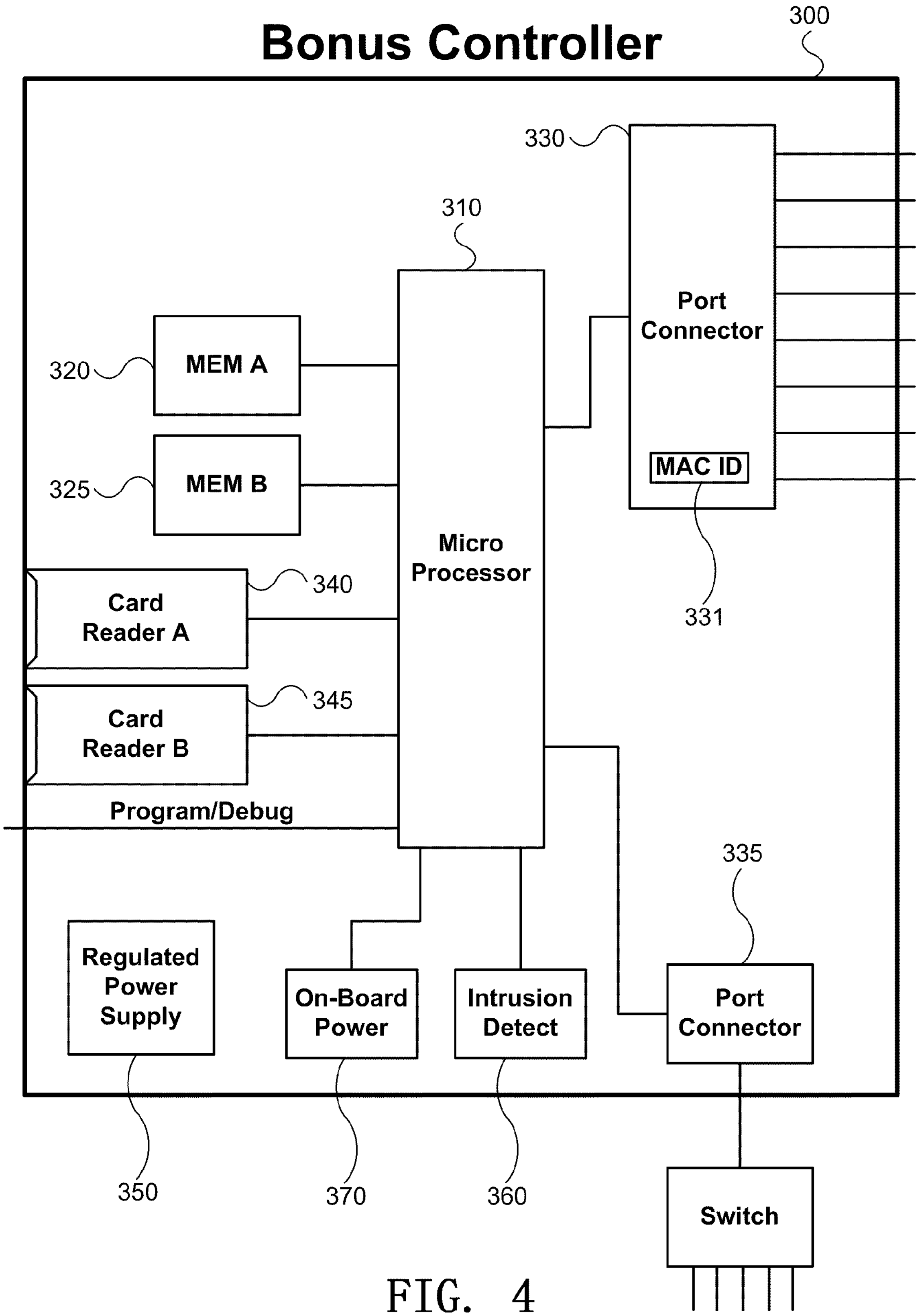
FIG. 4 is a block diagram of an example bonus controller shown in FIG. 1 according to embodiments of the invention.

With reference back to FIG. 1, recall that the bonus controller 40 couples to each of the MIDs 200, and by extension to their coupled EGDs, such as EGMs 10, and possibly to one or more EGMs themselves, to cause data and commands to be sent to the EGMs to control functions on each EGM. FIG. 4 is a detailed block diagram of such a bonus controller, according to embodiments of the invention.

A bonus controller 300 of FIG. 4 may be an embodiment of the bonus controller 40 illustrated in FIG. 1. Central to the bonus controller 300 is a microprocessor 310, which may be an Atmel AT91SAM9G20, which is readily available to developers. The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively a single card in either of the card readers 340, 345 may store both program and data information.

A port connector 330 includes multiple communication ports for communicating with other devices. With reference back to FIG. 3A, the communication processor of each MID 200 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single MID 20 (FIG. 1), which in turn connects to up to eight separate EGMs 10. Thus, a single bonus controller 300 may couple to sixty-four separate EGMs by connecting through appropriately connected MIDs.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 50 of FIG. 1. In practice, the second port connector 335 may additionally be coupled to a MID 20, thus providing the bonus controller 300 with the ability to directly connect to nine MIDs 20.

Yet further, Ethernet connections are easily replicated with a switch, external to the bonus controller 300 itself, which may be used to greatly expand the number of devices to which the bonus controller 300 may connect.

Because the bonus controller 300 is intended to be present on a gaming network 50, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 50 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied.

The on-board power circuit 370 may include an energy-storing material such as a battery or a large and/or efficient capacitor.

Similar to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port.

In operation the bonus controller 300 configures and controls bonus features on gaming devices through a gaming network 50 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

FIG. 5 is a table showing a conventional paytable for a poker game, which is used to help describe embodiments of the invention. Initially, the paytable 500 of FIG. 5 is the exact paytable for an existing game, specifically an IGT P1004 Bonus Poker game, the operation of which is well known. Referring back to FIG. 1, the IGT P1004 Bonus Poker game can be an embodiment of the gaming device 10, which may be included in the gaming system 2. In video draw poker, such as the Bonus Poker game, the game is played in two stages. In a deal stage, five cards are randomly selected from a simulated standard deck of 52 cards, and displayed to the player, such as, for example, showing them on the game display 130 of FIG. 2. After the deal stage, the player has the option to select cards for replacement. In some examples the player may replace any or all of the five cards from the initial deal stage. In other examples there are a maximum number of cards that the player may replace. In a final stage, the cards selected for replacement are replaced by cards newly dealt from the original standard deck. At the conclusion of the final stage, the player is paid according to the paytable, such as the paytable 500.

More specifically, the paytable 500 illustrates a pay award value, in number of credits, for each credit wagered. Only the winning awards are illustrated, and not those in which the wager is lost to the house. The lowest paying hand for the paytable 500 is a pair of jacks, and thus no hands having a lower value are paid. For example, a pair of 9's is a losing hand, and no credits are returned to the player. As illustrated on the paytable 500, the "hit-frequency" for this game is 45.5%, which means that, when optimally played, credits are returned to the player 45.5 percent of the time. The probability for each of the listed winning hand outcomes is given in the paytable 500. For example, there is a 7.4531% chance that the player will finish the game with a three of a kind.

In addition to probabilities of winning, a paytable, such as the paytable 500 also includes pay amounts for each of the potential outcomes. For example, a three-of-a-kind pays three credits for each credit wagered, while four aces pays 80 times the wagered amount. The "contribution" column of the paytable 500 provides information about how much payout is made for each outcome, in terms of percentage of credits wagered. For example, for every 100 credits accepted, approximately 21.5 credits will be paid back to players for hands of a pair of jacks, queens, kings, or aces, i.e., "jacks or better." Summing the contribution column yields the total for how much is paid back to the player, over time, for the particular game having the particular paytable. In this example, the paytable 500 pays back 96.872% of each credit received. Stated differently, this paytable gives the game a hold percentage of 100%-96.872%, or 3.28%. Thus, for every 100 credits wagered, the house keeps just over 3 credits, while providing the rest back to players in the form of winnings.

Looking at the bottom portion of the paytable 500, notice that just over 21% of the outcomes (jacks or better) provide only the wagered amount back, i.e., one credit, while another 12% pay two credits for having two pair. Neither of these wins provides great excitement for many players, especially skilled players who play often and may be seeking a bigger thrill.

The above numbers are given for the theoretical "optimum" player, which means that a player always plays for maximum payback from the machine, and makes perfect discard decisions. As described below, embodiments of the invention provide an incentive for a player to play non-optimally, at least according to some measures.

Embodiments of the invention allow a draw poker player to discard cards that are already winning outcomes, or those that could contribute to a winning outcome, in favor of a chance at a larger award. As described below, these embodiments improve the chances of the player winning a larger payback, during a bonus round, but this increased chance at a larger payback comes at an expense of a reduced probability of winning a smaller award in the base game.

In an example bonus game in accordance with the invention, bonus points or "points" are accumulated when a player plays non-optimally, or makes other decisions, that may affect the base game outcome. For example, with reference to a poker example that uses the paytable 500 of FIG. 5, a player may accumulate "points" when particular cards are discarded after the initial deal round, according to the schedule of Table 1:

TABLE 1

| Points | Discard | Payback Reduction |
|---|---|---|
| 1 | Any two cards of J, Q, K, or A | 6.26% |
| 2 | Any pair below J | 10.66% |
| 3 | Any pair of J, Q, K, or A | 14.88% |

In this embodiment, points are awarded on a per-credit-wagered basis. Thus, trading in a pair of jacks after wagering two credits yields 6 points toward a bonus game. The same pair with five credits earns 15 points. It is important to notice that if a player chooses to never "turn-in" cards that generate bonus points, then the paytable for that player is not affected whatsoever. Of course, players who do not participate in the "trade-in" are ineligible to win the bonus. It is also worth noting that, when bonuses are paid to the player for participating in or winning a bonus, that the "cost" for paying those bonuses may be borne or at last partially borne by savings realized by not having to pay for winning outcomes (or potentially winning outcomes) that the participating player "turns-in."

The payback reduction portion of Table 1 describes the potential winnings (theoretical payback) given up by the player in the base game for a chance to receive an award in the bonus game. Reductions arise primarily from a loss of a low paying outcome such as two-pair or jacks-or-better.

In one embodiment, whenever 15 points are accumulated, the points are automatically traded in for an entry card, randomly selected from a deck of 52 cards. The entry card, or notice of it, or some other indicator, may be stored in a player account, using a player-server embodiment of the server 60 and database 70 described above with reference to FIG. 1, or may be an indicator stored elsewhere in the game 10 or on the gaming system 2.

Figure 6A:
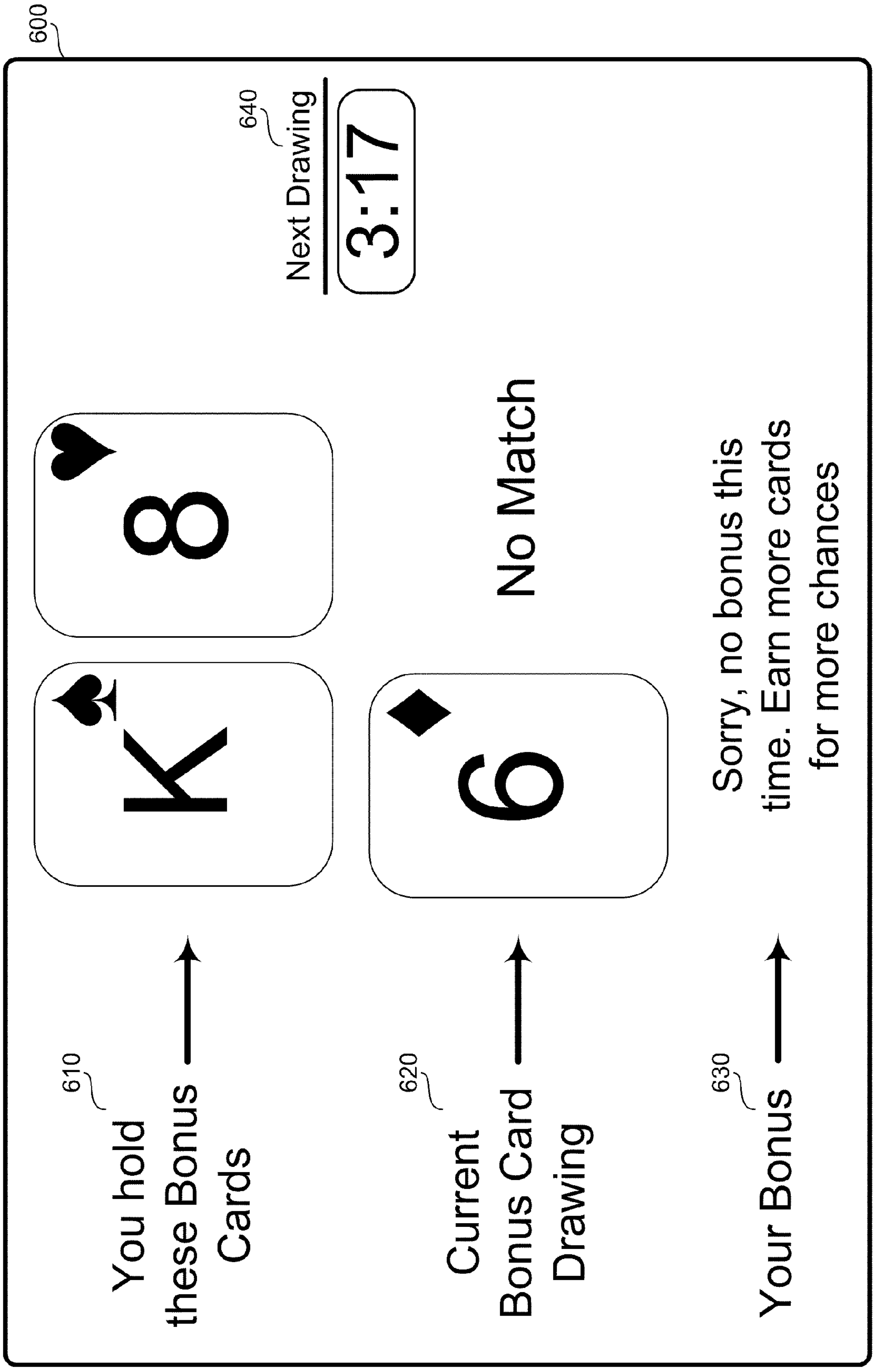
FIG. 6A is a diagram illustrating an example bonus screen illustrating operation of a bonus game according to embodiments of the invention.

As illustrated in FIG. 6A, the bonus holdings may be shown to the player on an example bonus screen 600, which may be an example of the game screen 130 of the gaming device 100 (FIG. 2), or portion of the screen, a screen on a set-top box 190, or may be another screen attached or related to the gaming device. Of course, the example screen 600 is but one example method of communicating details of the bonus to the player, and any other communication method additionally falls within the scope of the invention. The bonus screen 600 includes a player holdings area 610, which informs the player of the current bonus cards held by the player. As described above, for every 15 points accumulated by the player from discarding winning or potentially winning cards, another bonus card is automatically selected for the player. Players may hold multiple bonus cards, which may entice them to trade-in many potentially winning cards in a gaming session. In the example illustrated in FIG. 6A, the player holds two such bonus cards, the King of spades and 8 of hearts.

Periodically, for example every 5 minutes, a bonus drawing is held and a target card is randomly drawn from another deck of 52 cards. Any player who holds a bonus card that matches the selected target card wins, or is eligible for, the particular bonus. A target area 620 on the bonus screen 600 informs the player that the current target card is the 6 of diamonds, which does not match either of the two bonus cards held by the player in the area 610, and thus no bonus is won. A feedback area 630 of the bonus screen 600 informs the player that they have not yet won the bonus. A timer 640 informs the player when the next drawing will be.

Figure 6B:
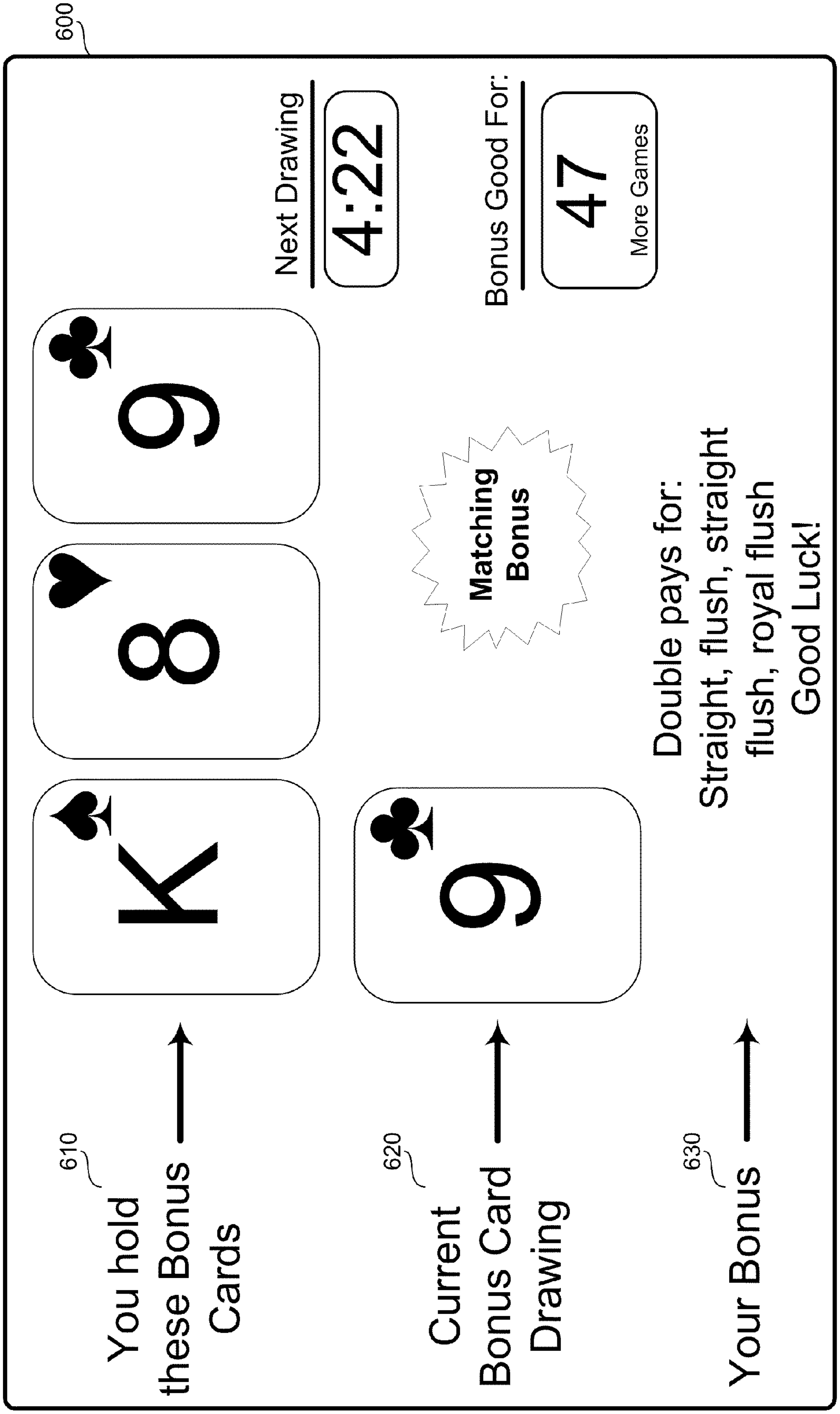
FIG. 6B is a diagram illustrating another example bonus screen illustrating operation of a bonus game according to embodiments of the invention.

With reference to FIG. 6B, an embodiment where the player wins the bonus is illustrated. In this example the current target card illustrated in the target area 620 is the 9 of clubs, which is held in by the player as a bonus card. The feedback area 630 informs the player that he or she has won the bonus, which in this example is a double-pay (as compared to the standard paytable 500 of FIG. 5) for an outcome of straight, flush, straight-flush, or royal-flush. To fully win the bonus, however, the player must actually receive one of the winning hands on the base game within the next fifty games played on the gaming device, as shown in a lapse area 640 of the bonus screen 600 of FIG. 6B. Over time, the number of games in the lapse area counts down to zero, at which time the time period for winning the double bonus expires.

In other variations, bonus cards held by the player may be substituted for discard cards in the base game, or may be allowed to be used by the player to make a hand of more than the typical five cards. For example, if a player held an 8 of hearts, he or she could discard a card of a different suit and substitute the 8 of hearts to complete a flush of five hearts. In another embodiment the player could simply “add” the 8 of hearts to a base hand and use six cards to make a five-card flush of five hearts.

Of course, the paytable 500 described above is but one example of how embodiments of the invention may operate, and those with skill in the art may easily adapt the invention to various implementations.

Variations of the bonus game abound. In some embodiments the bonus cards are awarded only after accumulating more or fewer points than 15. Intervals between rounds, points won per discard combination, and even the discard combinations may deviate from those described herein. Great latitude is afforded by bonus game designer by manipulating each of these variables independently or in concert to generate a desired outcome.

In other embodiments cards are not used at all, but rather another method of chance determines winning the bonus. In one such example the player may accumulate numbers, such as 1-100, and the periodic drawing draws a target number. If the bonus number held by the player matches the target number, the player wins the bonus, or is eligible to win the bonus. In yet other embodiments the bonus is won by spinning a wheel and matching a target number or by accumulating points above a minimum. Bonuses may be active for more or fewer games than fifty. In short, any method of awarding a bonus (or awarding a right to participate in a bonus) that may provide an incentive to the player for surrendering something of value, such as a win (or potential win) on a base game falls within the scope and spirit of the invention.

In some embodiments the bonus cards are held only until a bonus is won by the player, who then surrenders all of the bonus cards to participate in the bonus. In other embodiments, only the bonus card that matches the target card is eliminated. In yet other embodiments, a player holds on to all accumulated bonus cards, even the ones that have matched previously drawn target cards, until the end of the bonus. The end of the bonus may be based on time, such as 24 hours, or based on session length, such as the time between when credits are entered on the machine and when the credits are cashed out or lower to zero. In other embodiments the state of the bonus game may be stored on a player account and renewed when a player inserts his or her player card to identify the player to the gaming network 2 (FIG. 1). In other embodiments the bonus continues until a set amount of bonus awards have been awarded for a particular group, such as players in a particular casino. Other embodiments continue the bonus until other events occur, such as a string of losses by the player. Further, specific bonuses (or bonus multipliers) may be configured to vary based on time of day, day of week, holiday weekends, etc.

Figure 7A:
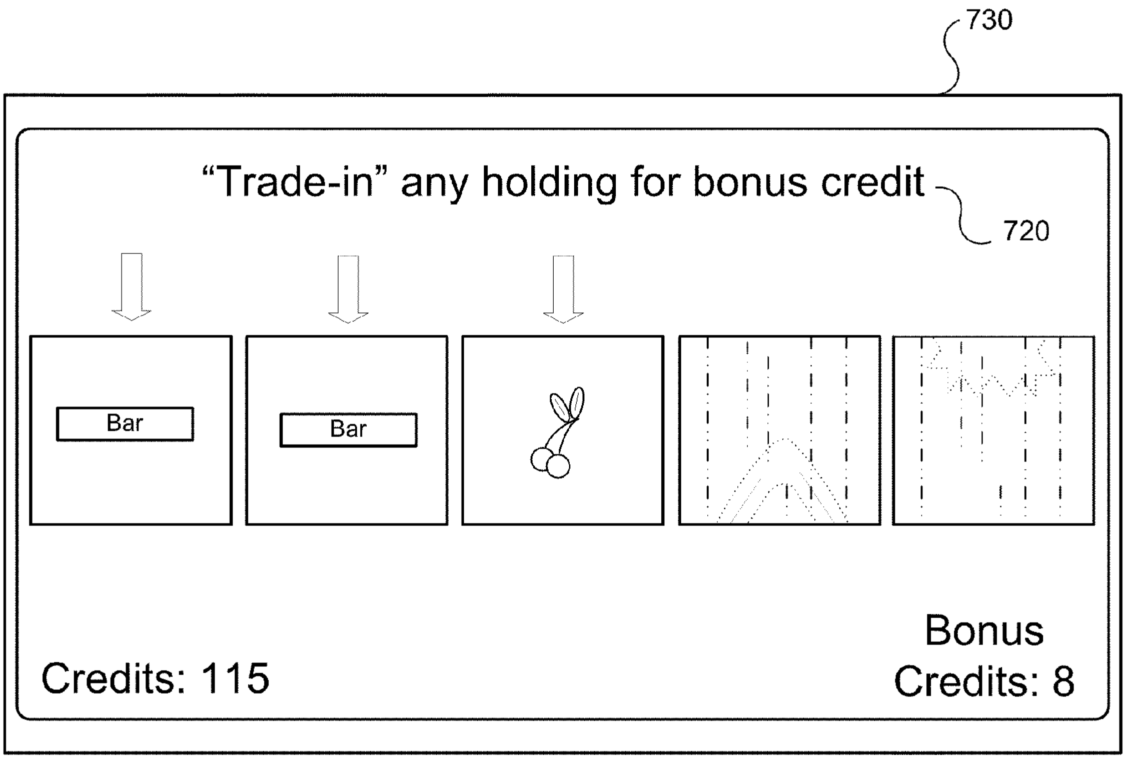
FIGS. 7A-7D are screen diagrams illustrating the game screen of an example game using trade-in concepts according to embodiments of the invention.

FIGS. 7A-7D illustrate another form of surrendering an interim game outcome for a chance to win an award in another manner, according to embodiments of the invention. For this embodiment, FIG. 7A illustrates a game screen 730, which may be an example screen of the gamescreen 130 of FIG. 2. The game screen 730 is a five-reel slot machine but, of course, these concepts apply to any type of game. Also, although many five-reel slot machines are “multi-line” games, this illustration shows only the center payline of a five-reel game for simplicity. Of course, other forms of reel games, and other types of games can use these inventive concepts to their advantage.

FIG. 7A illustrates a five-reel slot game in which the first three reels have sequentially stopped. After the third reel stops, the gaming device 100 gives the player a chance to trade-in one or more symbols that appear on the reels, by generating a message for the player as indicated at 720. If a trade-in offer is accepted by the player, the game awards bonus points for surrendering this interim game outcome. For example, assume that the base game pays an award if any three designated symbols appear on the reels when they stop, and an even higher award if four designated symbols appear, and yet an even higher award if five designated symbols appear. In this example, in FIG. 7A, the first two reels match while the third reel is different. The fourth and fifth reels haven't been determined and are still spinning.

Figure 7B:
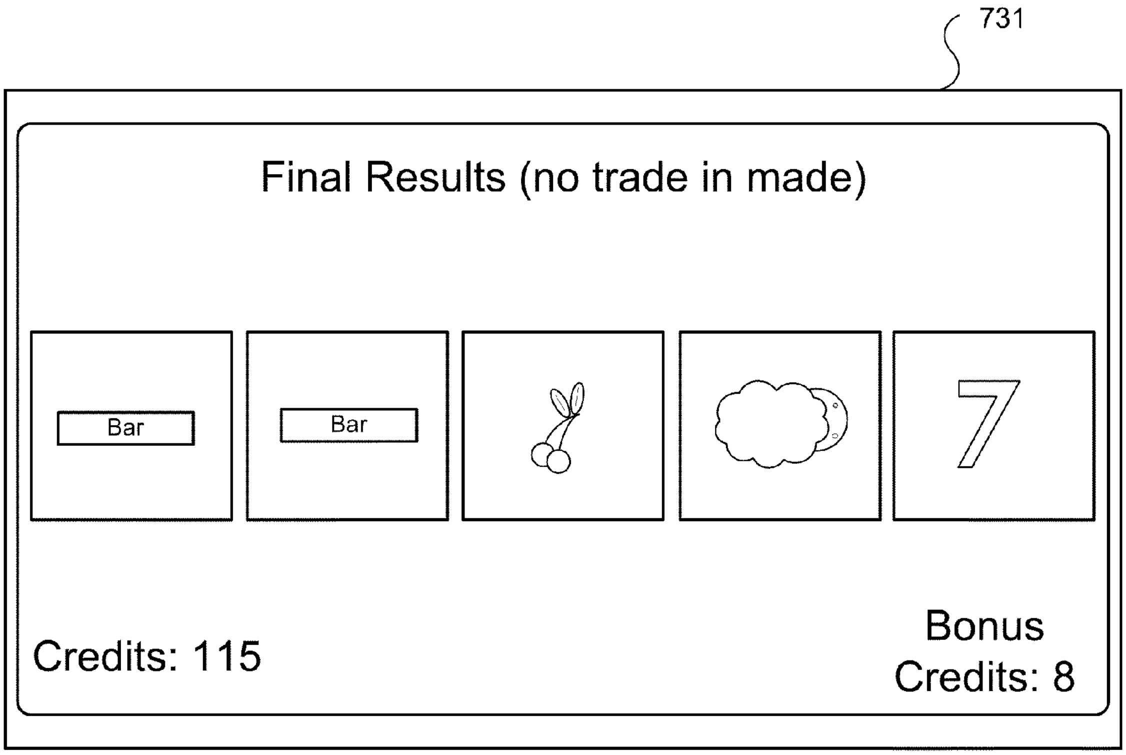

After the third reel stops, the game gives the player the option to surrender any or all of the interim holdings currently held. Different values of bonus points/opportunities are given for surrendering different holdings. In one embodiment, the higher the value of the surrendered holdings yields a higher number of bonus points awarded. If the player, however, chooses to not surrender any of the interim holdings, then there is no difference from the original game. Such an example is illustrated in FIG. 7B, where the player has chosen to not surrender any of the first three reels. The fourth and fifth reels are stopped, in succession, as in the standard base game. Since the player has not surrendered any of the interim holdings, the five naturally and initially spun reels are presented to the player in the screen 730 of FIG. 7B, and the player is paid according to the original paytable of the base game. Note that because there were no three, four, or five symbol matches in the game, that no credits are added to the credit meter. Also note that the bonus credit meter remains the same, as the offer to surrender the interim holdings was rejected by the player.

Figure 7C:
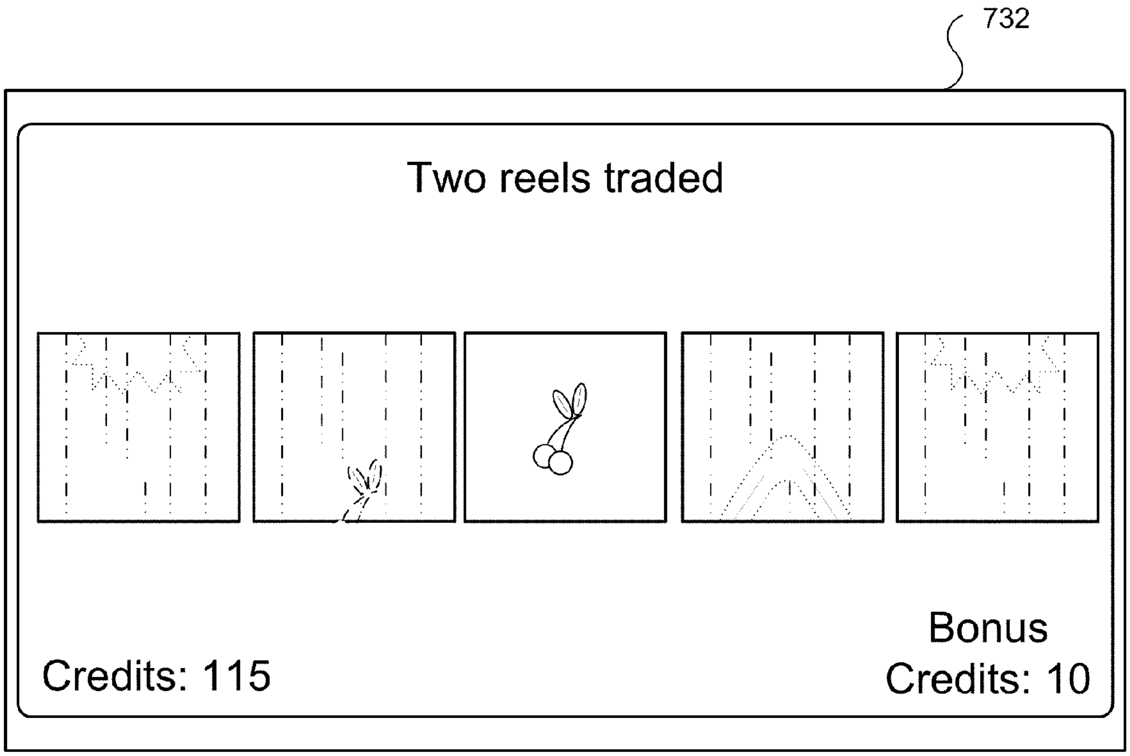
Figure 7D:
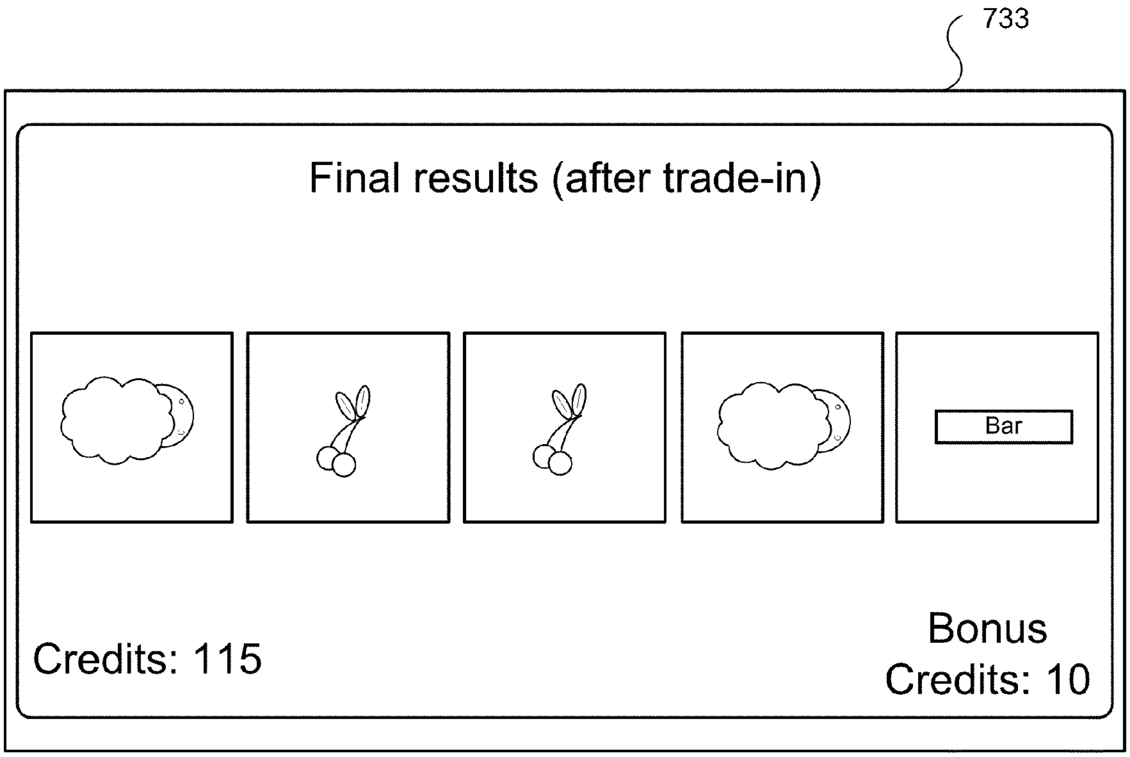

Alternatively, as illustrated in FIG. 7C, after receiving the offer to trade-in the interim holdings of FIG. 7A, the player chooses to surrender the two matching symbols of the original three reels, and the first two reels begin spinning again. The fourth and fifth reels remain spinning as well, as they have never stopped. Then, as illustrated in FIG. 7D, the four spinning reels stop, and the player is paid according to the paytable of the game. In some embodiments the game is prohibited from stopping on a symbol that matched a surrendered symbol, and in other embodiments the replacement symbols may match the one or ones surrendered. In yet another embodiment, the replacement symbols may be allowed to be surrendered again, regardless of whether the replacement symbols matched the originally surrendered symbols or not.

With reference to FIG. 7D, recall that the player earns bonus points, or a bonus itself, for having surrendered the interim holding, in addition to the base game points (if any) won from the standard paytable. In the example shown in FIGS. 7B and 7D, the player received more bonus points from trading in a potentially winning result, a pair of matching symbols, than had the player merely traded in a non-winning holding, or non-potentially winning holding. This is seen by the bonus credit meter moving from 8 to 10 credits. Comparing the final outcomes of FIGS. 7B and 7D, in neither case did the final reel positions pay any base game credits, but note that, because the player in FIG. 7D traded in an interim holding, the number of bonus credits increased.

These described embodiments of surrendering an interim holding are significantly different than a nudge, which is a known procedure in which a player is allowed to move a current holding one or perhaps two positions in either direction. Most differently, a nudge is typically awarded as a bonus itself, i.e., the act of being able to play a nudge is the bonus award, rather than the act of surrendering a holding cause a bonus to be awarded or bonus points accumulated.

Figure 8A:
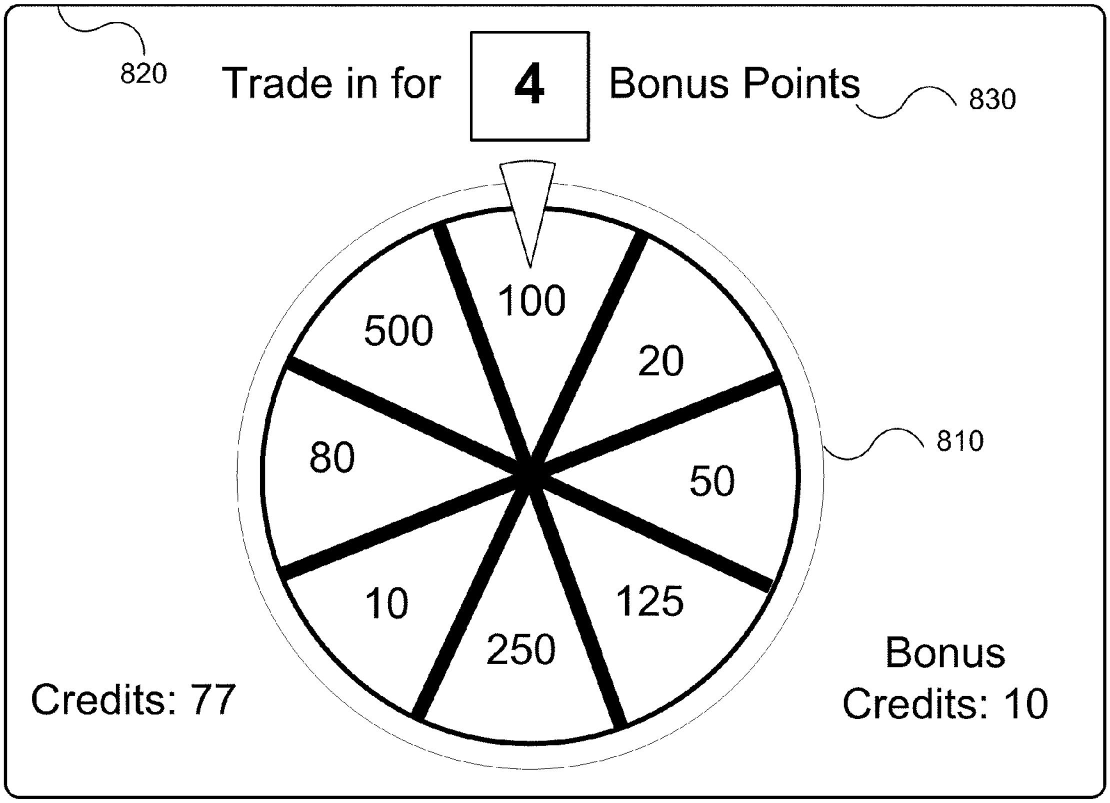
FIGS. 8A and 8B are screen diagrams illustrating the bonus screen of an example bonus game using trade-in concepts according to embodiments of the invention.
Figure 8B:
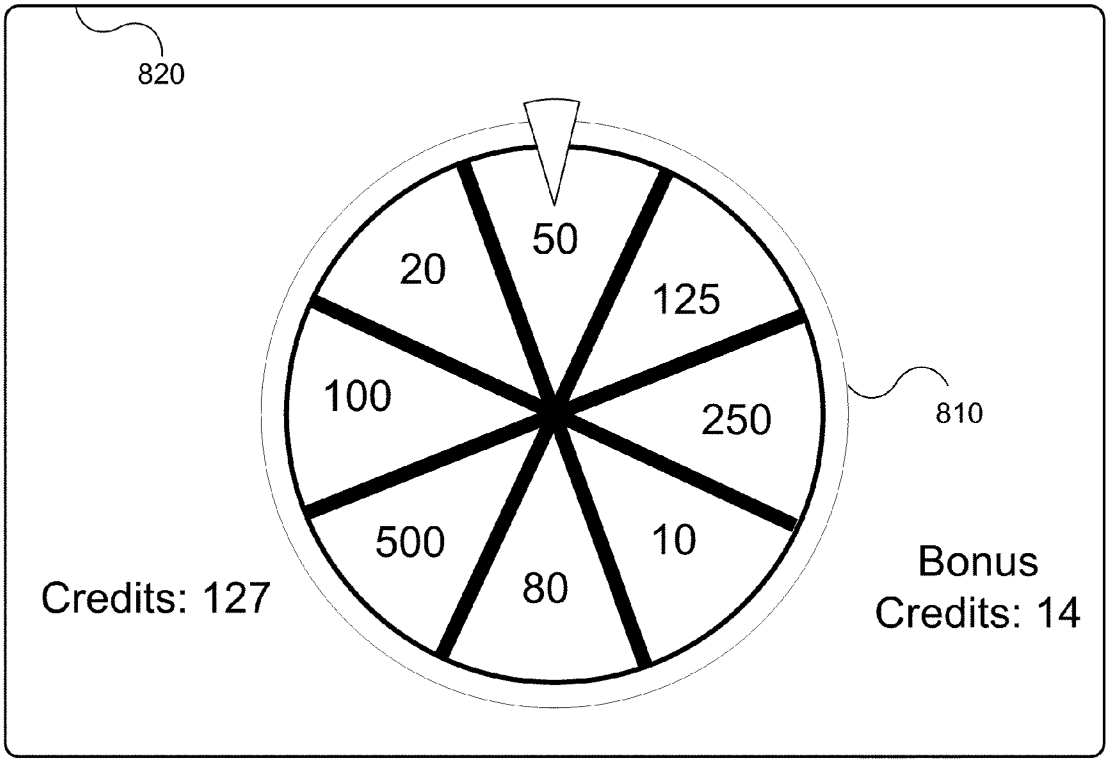

The same concept of surrendering an interim holding applies to surrendering a holding during a bonus game. With reference to FIG. 8A, a bonus wheel 810 is illustrated in a bonus screen 820. The bonus screen 820 may be an example of a screen presented on a set top box 190 of FIG. 2, or may be any other screen on the gaming device 100.

In FIG. 8A the bonus wheel rests at a 100 credit award, but a trade in offer is presented to the player as illustrated at 830. In this case the player is given an opportunity to trade in the current 100 credit award for four bonus points and another spin of the bonus wheel. Higher bonus points may be awarded for higher surrendered awards. In this case the player may be enticed to surrender the 100 credit award for a chance at an even higher award, plus be given the bonus points as an additional incentive. In some embodiments, such as those described above, the player receives a bonus award, or right to earn a bonus award, when the accumulated bonus credits exceed a threshold. Although in the above-described embodiment the player earned both bonus points plus a chance to spin the wheel 810 again, in other embodiments the offer to the player may be a lesser, static award, combined with bonus points. For instance, another offer could be for the player to keep 40% of his or her winnings, along with the offered bonus credits.

Figure 9:
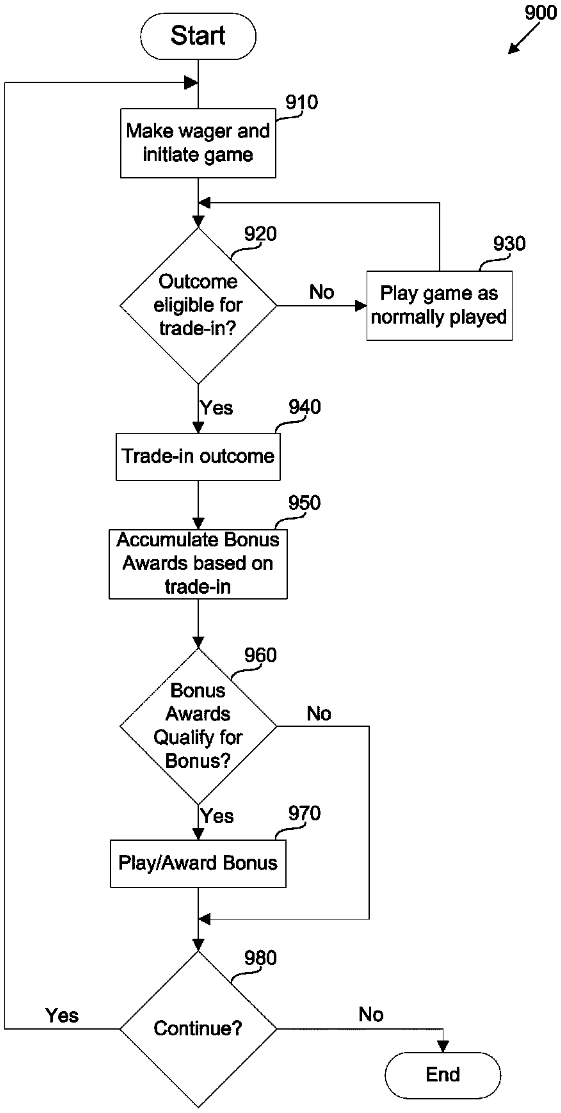
FIG. 9 is an example flow diagram showing example processes that can be used in embodiments of the invention.

FIG. 9 is an example flow diagram showing example processes of a flow 900 that can be used in embodiments of the invention. After the flow 900 initiates, a player makes a wager and initiates a game in a process 910. The game may be operating on the gaming device 10 of FIG. 1, for instance. In such an embodiment, information about the player and the player actions are generated by, sensed, passed through, or read by the MID 20 and bonus controller 40 of FIG. 1. In other embodiments, the MID 20 and/or bonus controller 40 are not present in the gaming system 2 of FIG. 1, and all of the processing and game management occurs on the gaming device 10, solely. In a process 920 an outcome appears on the base game for which the player becomes eligible for a trade-in. The occurrence of such an event may be signaled by a special sound, image, or other attention-garnering facility on the gaming device 10, and may be initiated by the gaming device itself, or by the MID 20 or bonus controller 40.

If the player chooses to not participate in the trade-in, the flow 900 proceeds to a process 930 where the game is played as if the trade-in bonus were not even present, and the flow loops back to the process 920 until the player decides to take advantage of a trade-in.

In a process 940, the player trades-in something of value, such as a game outcome, for a right to earn a bonus award, which is awarded in a process 950. As described above, the bonus award may be an accumulation of points, or may be the awarding of a bonus card itself. In a process 960, a decision is made whether the accumulated bonus points or bonus opportunities qualify for a bonus. An example occurrence of this is when a target card is drawn that matches a bonus card held by the player, as described above with reference to FIG. 6B above. This condition may be satisfied in a myriad of ways, as described above. For example, receiving a bonus spin on a wheel, or spinning to a winning number on a wheel would satisfy the condition in the process 960. The bonus is then awarded, paid, or the player is allowed to attempt to play for the bonus award in a process 970.

After the bonus is awarded, the player may choose to continue play in a process 980, and the flow 900 loops back to the beginning where he or she may choose to make another trade-in bonus.

In operation, as described above, the bonus controller 40 may include the code to implement the above-described bonus system. The bonus controller 40 receives information about gameplay on the gaming device 10, and about the player himself or herself, by monitoring the connection port of the game, such as the connection port 130 of FIG. 2. Programs and codes on the bonus controller 40 monitor conditions, including receiving contemporaneous data and comparing it to stored data, until the bonus controller causes the gaming device 10 to perform a certain action. For example, the bonus controller 40 may generate the bonus screen 600 of FIGS. 6A and 6B, independently, without any interference from the gaming device 10. In other embodiments the bonus controller 40 instructs the gaming device 10, or other gaming device, to generate the bonus screens or perform other actions. In other embodiments the bonus controller 40 may monitor any operation on any connected device, such as the personal computer 72, cell phone 34, or EGM 12 of FIG. 1 and generate appropriate commands to control such devices as described above.

In yet other embodiments or implementations, also described above, the operation of the herein-described bonus is managed solely by a gaming device, such as the gaming device 10 (FIG. 1) itself. In such an embodiment, programs or codes are executed or performed by computer hardware, such as the game processor 120 to affect the bonus. Yet other embodiments share the responsibility for the bonus operation among any or all of the gaming device 10, MID 20, and bonus controller 40.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of playing a game on a slot machine that displays winning and non-winning game outcomes as a set of a predefined number of displayed symbols on reels along a line comprising:

receiving value from a player for wagering on the slot machine via a bill acceptor associated with the slot machine;

validating via the acceptor one of a bill and a ticket received at the acceptor;

initiating a game on the slot machine in response to an input from a player;

displaying to the player less than the predefined number of symbols along the line to determine a game outcome on a display of the gaming device by a processor of the gaming device;

receiving, by the processor, a choice made by the player to return at least one of the displayed symbols to the gaming device when the at least one displayed symbol is a subset of at least one winning game outcome for the device;

returning the at least one displayed symbol to the gaming device responsive to receiving the choice;

replacing, on the display, by the processor, the at least one symbol with a corresponding number of symbols along the line in the positions previously occupied by the returned at least one symbol;

completing the game by the processor;

providing, by the processor, the player compensation in exchange for returning the at least one displayed symbol, the compensation being usable to obtain a bonus that is awarded after the game outcome is determined; and cashing out any remaining value received from the player and awards accumulated during game play by printing a ticket on a ticket printer associated with the slot machine in response to an input from the player.

2. The method of claim 1 in which the compensation is a bonus award.

3. The method of claim 1 in which the compensation is the ability to participate in a bonus round.

4. The method of claim 1 in which the subset of at least one winning game outcome is a lowest-returning portion of a paytable of winning game outcomes for the gaming device.

5. The method of claim 1 further comprising selecting winning game outcomes and non-winning game outcomes from a paytable responsive to a random event.

6. The method of claim 1 further comprising displaying to the player additional symbols beyond any remaining symbols after returning the at least one displayed symbol to bring the number of displayed symbols to the predefined number.

7. The method of claim 1 wherein the returned at least one displayed symbol is each selected by the player and is a subset of the displayed symbols.

8. A method of playing a game on a slot machine that displays winning and non-winning game outcomes as a set of a predefined number of displayed symbols on reels along a line comprising:

receiving value from a player for wagering on the slot machine via a bill acceptor associated with the slot machine;

validating via the acceptor one of a bill and a ticket received at the acceptor;

initiating a game on the slot machine in response to an input from a player;

generating a game outcome responsive to a random event;

providing a player with less than the predefined number of symbols in the generated outcome on a display of the gaming device by a processor of the gaming device;

offering the player by the processor an incentive in the form of a bonus award to return at least a portion of the displayed symbols while simultaneously offering the player no incentive to hold all of the displayed symbols;

when acceptance of the offer from the player is received, completing the game by:

returning the at least a portion of the displayed symbols responsive to receiving acceptance of the offer;

replacing the returned portion with a corresponding number of symbols along the line in the position previously occupied by the returned portion;

providing by the processor the bonus award to the player when the at least a portion of the displayed symbols is returned and displaying the bonus award to the player on the display; and displaying the generated outcome including the replaced symbols;

when acceptance of the offer from the player is not received, completing the game by displaying the generated game outcome; and cashing out any remaining value received from the player and awards accumulated during game play by printing a ticket on a ticket printer associated with the slot machine in response to an input from the player.

9. The method of claim 8 in which offering the player an incentive in the form of a bonus award comprises offering a bonus award above a paytable upon which the generated game outcome is based.

10. The method of claim 8 in which the incentive in the form of a bonus award is one or more bonus points.

11. The method of claim 10, further comprising paying the player a bonus award when a total number of bonus points held by the player exceeds a threshold.

12. The method of claim 10, further comprising awarding the player a bonus when a total number of bonus points held by the player exceeds a threshold.

13. The method of claim 12 in which the bonus is a bonus-winning window.

14. The method of claim 13 in which an amount of time the bonus-winning window is open is measured in games played by the player.

15. The method of claim 13 in which an amount of time the bonus-winning window is open is measured in time.

16. The method of claim 8 in which providing an award to the player comprises providing an award to the player when the less than all the number of predefined symbols is in a paytable upon which the generated game outcome is based.

17. The method of claim 8 in which providing by the processor the bonus award to the player comprises providing an award to the player when the less than all the number of predefined symbols makes a portion of a winning game outcome.

18. The method of claim 8 in which the bonus award is made at a first level when the less than all the number of predefined symbols is any two dissimilar cards of Jack, Queen, King, or Ace.

19. The method of claim 18 in which the bonus award is made at a second level, higher than the first level, when the less than all the number of predefined symbols is any pair of cards having a value less than a pair of Jacks.

20. The method of claim 19 in which the bonus award is made at a third level, higher than the second level, when the less than all the number of predefined symbols is any pair of Jack, Queen, King, or Ace.

21. The method of claim 8 further comprising evaluating game outcomes using a paytable when acceptance of the offer is not received.

22. The method of claim 8 in which offering the player by the processor an incentive in the form of a bonus reward to return at least a portion of the displayed symbols comprises offering the player by the processor an incentive to return at least a portion of the displayed symbols only when the at least a portion of the displayed symbols to be returned is a subset of at least one winning game outcome of a paytable.

23. The method of claim 8 further comprising displaying to the player additional symbols beyond any remaining symbols after returning the at least a portion of the displayed symbols to bring the number of displayed symbols to the predefined number.

24. The method of claim 8 wherein each of the symbols in the returned at least a portion of the displayed symbols is selected by the player and is a subset of the displayed symbols.

* * * * *